United States Patent
Pinniboyina et al.

(10) Patent No.: US 11,132,671 B2
(45) Date of Patent: Sep. 28, 2021

(54) GESTURE-CONTROLLED PAYMENT INSTRUMENT

(71) Applicant: Visa International Service Association, San Francisco, CA (US)

(72) Inventors: Vinod Kumar Pinniboyina, Bangalore (IN); Habeeb Shaik Khadar, Chittoor (IN); Mohan Babu Nellore, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/591,715

(22) Filed: Oct. 3, 2019

(65) Prior Publication Data
US 2021/0103914 A1    Apr. 8, 2021

(51) Int. Cl.
*G06Q 20/32*    (2012.01)
*G06Q 20/40*    (2012.01)
*G06K 9/00*    (2006.01)

(52) U.S. Cl.
CPC ..... *G06Q 20/3278* (2013.01); *G06K 9/00355* (2013.01); *G06Q 20/40* (2013.01)

(58) Field of Classification Search
CPC .............. G06K 9/00355; G06Q 20/40
See application file for complete search history.

(56) References Cited

U.S. PATENT DOCUMENTS

| | | | | |
|---|---|---|---|---|
| 8,608,548 | B2* | 12/2013 | Mattice | G07F 17/3251 463/25 |
| 8,616,984 | B2* | 12/2013 | Mattice | G07F 1/06 463/47 |
| 8,684,839 | B2* | 4/2014 | Mattice | G10L 17/00 463/36 |
| 2012/0130895 | A1* | 5/2012 | Granbery | G06Q 20/327 705/44 |
| 2016/0109954 | A1* | 4/2016 | Harris | G06K 9/00268 345/156 |
| 2017/0154328 | A1* | 6/2017 | Zarakas | G06Q 20/204 |
| 2017/0255938 | A1 | 9/2017 | Biegun et al. | |
| 2018/0150846 | A1* | 5/2018 | Maheshwari | G06Q 20/322 |
| 2019/0311109 | A1* | 10/2019 | D'Agostino | G06K 19/07762 |

\* cited by examiner

*Primary Examiner* — Bennett M Sigmond
*Assistant Examiner* — Matthew Cobb
(74) *Attorney, Agent, or Firm* — The Webb Law Firm

(57) ABSTRACT

The present disclosure relates to user authentication using a contactless payment instrument. The contactless payment instrument includes a contactless chip and a gesture control module. The user makes one or more gestures at an access device during a card-present transaction scenario and the gestures are validated and the authentication status is determined by matching the gesture made by the user at the time of the transaction with one or more predefined gestures. If the authentication is successful, the payment instrument transmits the payment information required for conducting the transaction.

7 Claims, 5 Drawing Sheets

GESTURE-CONTROLLED PAYMENT INSTRUMENT

TECHNICAL FIELD

The present disclosure relates to performing payment transactions. More specifically, the disclosure relates to performing payment transactions using contactless payment instrument.

BACKGROUND

The recent rapid growth in contactless payments is shaping new behaviors in the way everyday purchases are made. Contactless payments make a transaction faster than a traditional card transaction or payment by cash. At a retailer, a contactless payment instrument owner simply holds the payment instrument within an operating field of an access device. When the payment instrument is in the operating field of the access device, the encrypted details of the payment instrument required for conducting the transaction is transmitted to the payment reader. In contactless payment, the payment instrument never leaves the owner's hand and does not require the payment instrument to be dipped in the access device. Therefore, contactless payments offer consumers a fast, secure and convenient way to pay, providing merchants with significant opportunities to reduce queuing and improve in-store payment experience.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present disclosure are illustrated by way of example, and not in way by limitation, in the figures of the accompanying drawings and in which like reference numerals refer to similar elements and in which.

Figure 1:
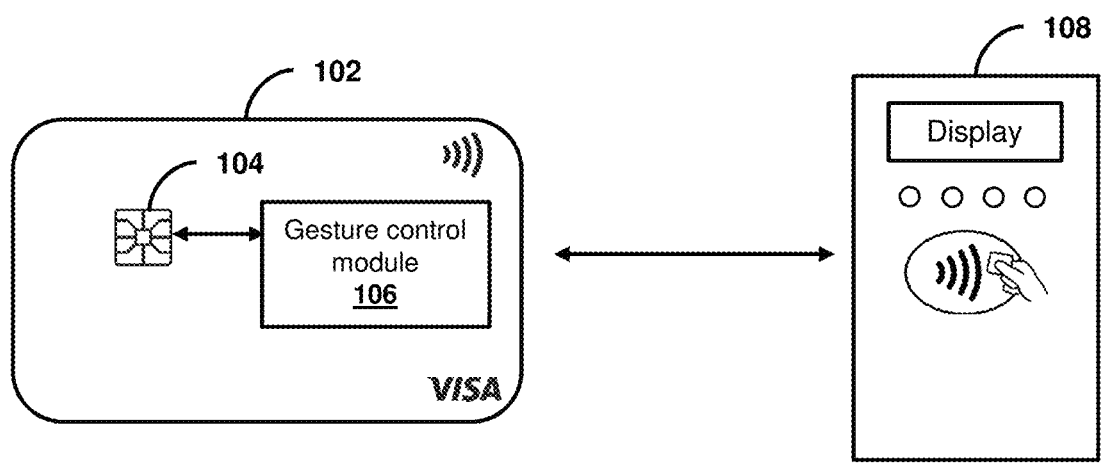
FIG. 1 is a block diagram of system illustrating a payment instrument with a gesture control module, in accordance with one or more embodiments.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present disclosure. It will be apparent, however, that the example embodiment(s) may be practiced without these specific details. In other instances, well-known structures and devices are shown in block diagram form in order to avoid unnecessarily obscuring the example embodiment(s).

As an initial matter, some terms can be described in further detail.

An "access device" may be any suitable device that provides access to a remote system. An access device may also be used for communicating with a portable device, a network computer, an authorizing entity computer, or any other suitable system. An access device may generally be located in any suitable location, such as at the location of a merchant. An access device may be in any suitable form. Some examples of access devices include point of sale (POS) devices (e.g., POS terminals), cellular phones, personal digital assistants (PDAs), personal computers (PCs), tablet PCs, handheld specialized readers, set-top boxes, electronic cash registers (ECRs), automated teller machines (ATMs), virtual cash registers (VCRs), kiosks, security systems, access systems, and the like. In some embodiments, an access device can be a device that acts as an access device at a gas station or other location. In some embodiments, where an access device may comprise a POS terminal, any suitable POS terminal may be used and may comprise a reader, a processor, and a computer-readable medium. An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with portable devices such as payment cards.

A "portable device" may comprise any suitable electronic device that may be operated by a user, which may also provide remote communication capabilities to a network of remote communication capabilities include using a mobile phone (wireless) network, wireless data network (e.g., 3G, 4G, or similar networks), Wi-Fi®, Wi-Max™, or any other communication medium that may provide access to a network such as the Internet or a private network. Examples of portable devices are mobile phones (e.g., cellular phones), PDAs, tablet computers, notebooks, laptop computers, personal music players, hand-held specialized readers, etc. Further examples of portable devices are wearable devices, such as smart watches, fitness bands, ankle bracelets, rings, earrings, etc., as well as automobiles with remote communication capabilities. In some embodiments, a portable device can function as a payment device (e.g., a portable device can store and be able to transmit payment credentials for a transaction). A "portable consumer device" may be an example of a "portable device." A portable consumer device may refer to any instrument that enables the user to make payments to a merchant. The portable consumer device may be a static instrument which provides user credentials for enabling the transactions. The portable consumer device may also be referred as a payment instrument. A credit card, a debit card, a prepaid card and a gift card may be examples of the payment instruments.

"Transaction data" may refer to information associated with a transaction. For example, transaction data may comprise one or more of an authorized amount (e.g., transaction amount, item value, etc.), other amount, terminal country code, terminal verification results, transaction currency code, transaction date, transaction type (e.g., card-present transaction, card-not-present transaction, high value transaction, low value transaction, local transaction, international transaction, etc.), an unpredictable number, application interchange profile (AIP), application transaction counter (ATC), issuer application data (IAD), etc.

A "user" may include an individual. In some embodiments, a user may be associated with one or more personal accounts and/or portable devices. The user may also be referred to as a cardholder, account holder, consumer or a consumer.

"Credentials" may comprise any evidence of authority, rights, or entitlement to privileges. For example, access credentials may comprise permissions to access certain tangible or intangible assets, such as a building or a file. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a sub token, a gift card number or code, a prepaid card number or code, a user name, an expiration date, a CVV (card verification value), a dCVV (dynamic card verification value), a CVV2 (card verification value 2), a CVC3 (card verification code), etc. An example of a PAN is a 16-digit number, such as "4147 0900 0000 1234". In some embodiments, credentials may be considered sensitive information.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV, a dCVV, a PAN, a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction-processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer.

An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "network computer" may refer to a computer or a network of computers that processes transactions. In some embodiments, the network computer can be in an electronic system used to accept, transmit, or process transactions made by user devices for money, goods, services, or access to locations or data. The network computer may transfer information and funds among issuers, acquirers, transacting parties, and users. An example of the network computer may include a payment processing server computer such as VisaNet®, operated by Visa®. Payment processing server computers such as VisaNet® are able to process credit card transactions, debit card transactions, and other types of commercial transactions. VisaNet®, in particular includes a Visa Integrated Payments (VIP) system which processes authorization requests and a Base II system which performs clearing and settlement services. In other embodiments, a network computer can be a collection of computers that can allow access to a person seeking to access a particular location. In yet other embodiments, a network computer can be a collection of computers that can allow access to specific types of data (e.g., governmental agencies).

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "payment platform" may refer to an environment which has multiple abstraction levels, a computer architecture and one or more hardware and software tools for enabling a transaction between two parties. The payment platform mostly provides one or more Application Program Interface (API) to issuers, acquirers and merchants on various transaction parameters. The payment platform has one or more services that can be subscribed by other stakeholders in the payment ecosystem for facilitating a transaction. The services may be related to user identity management, loyalty and offers management, risk and fraud mitigation, authentication services, processing services, on-behalf authorization, and the like. One such example of the payment platform is VisaNet™ owned and operated by Visa Inc.® which enables money transfer from one account to another account along with a host of other services mentioned above.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

The various embodiments of the present disclosure provide a system and method for transacting at a merchant location using a gesture controlled payment instrument. As described in the above sections, a payment instrument is a portable consumer device which is used for carrying out a transaction. The examples of the payment instrument include, but are not limited to a credit card, a debit card, a gift card, a prepaid card, a key fob, a payment ring, a payment band, and a payment wearable. In accordance with one or more embodiments of the present disclosure. The payment instrument is embedded with a chip which enables the payment instrument to transmit credentials for conducting transaction. The payment instrument is enabled to make a transaction using contact or contactless manner. For enabling the payment instrument to make transactions in a contactless manner, a contactless chip such as a near-field communication (NFC) chip is embedded on the payment instrument that can transmit the user's payment credentials to the access device. The transmission of the user's payment credentials is successful only when the payment instrument is in an operating field of the access device. The operating field of the access device refers to the range in which the access device can communicate with the contactless payment instrument. The contactless chip in the payment instrument uses one of the standard near-field communication protocols well known in the state-of-art. The contactless chip in the payment instrument is a passive electronic device that can communicate with the other electronic devices using near-field communication. The payment instrument can make a contactless payment only when the access device is also enabled with necessary hardware and software required for supporting the contactless transactions. Such an access device is called a contactless access device. The contactless access device along with the capabilities of processing transactions in contactless manner, also have the capability to accept traditional payment instruments without contactless chip and process the transactions in contact manner (e.g. swipe transactions and dip transactions). The contactless chip in the payment instrument gets powered up and transmits the credentials only when the payment instrument is in the field of the contactless access device. Whenever the access device is powered-up, a power-up status is set on the access device, which is detectable by the payment instrument. The operating field of the contactless access device is configured according to contactless payments standards. The operating field of the contactless access device may also depend on factors such as the hardware specifications and tuning frequency of the access device. For example, the field in which the payment instrument can transmit the credentials to the contactless access device may be four centimeters. When the payment instrument is not in the operating field of the contactless access device, the credentials cannot be transmitted.

Contactless transactions are faster and easier for both customers and the merchants as this mode of transaction reduces the time required for the customer to spend at a billing counter. The payment instrument need not change hands from the customer to the cashier and does not require the payment instrument to be dipped or swiped at the access device. This also means that the queues are reduced and the merchants are able to process more transactions within a given time.

Even though the contactless payments are as secure as the traditional contact payment method, consumers would like to have more control over the usage of contactless payments and do not want unintended transactions to take place when the payment instrument is accidentally in the field of the contactless access device. Therefore, an upgrade from the traditional contactless payment instrument to a gesture controlled payment instrument is desired. In an embodiment, the gesture-controlled payment instrument may include an embedded gesture control module. The gesture-controlled payment instrument has one or more gesture enablement state. The gesture enablement state in the payment instrument determines the transmission of the credentials to the nearby contactless access device. The one or more gesture enablement state includes an ACTIVE state and an INACTIVE state. When the gesture enablement state is in ACTIVE state, the payment instrument is configured to transmit the credentials to the contactless access device and when the gesture enablement state is in INACTIVE state, the payment instrument is configured not to transmit the credentials of the user to the contactless access device. The gesture enablement state is stored as a flag variable in the contactless chip of the payment instrument.

In an embodiment, the gesture control module is configured to internally communicate with the contactless chip of the payment instrument and the contactless chip upon receiving the communication from the gesture control module, the contactless chip is configured to communicate with the contactless access device about the enablement state of the payment instrument. When the payment instrument is enabled for gesture-controlled transaction, the user must make pre-defined gesture to transmit the credentials to the contactless access device, and if the payment instrument is disabled for the gesture-controlled transaction, the normal contactless transaction takes place. The enablement and disablement state of the payment instrument for conducting gesture controlled transactions is by enabling or disabling "ACTIVE" state or "INACTIVE" state respectively on the payment instrument.

FIG. 1 is a block diagram of system 100 illustrating a contactless transaction between a payment instrument 102 and an access device 108. Both the payment instrument 102 and the access device 108 are enabled for conducting contactless payments. As described above, the payment instrument 102 is a consumer payment device owned by the user and is issued by an issuer for enabling the user to make transactions at offline and online stores. The examples of the offline stores include a retail store, a ticketing counter, a gas station, a parking terminal, a toll booth and the like, where both the user (cardholder) and the payment instrument (for example, card) is present, and the transaction takes place in presence of user. The examples of the online stores include e-commerce, m-commerce web portals, virtual stores where the payment transaction takes place without the presence of the user and the payment instrument at the location of the store.

The present disclosure is particularly useful in a card present scenario. The card present scenario is a situation where both the user and the payment instrument are present and are required for making a transaction. In accordance with the various embodiments of the present disclosure, the user can make contactless payments on the access device 108 using one or more predefined gestures with the payment instrument 102. In an embodiment, the payment instrument 102 includes a contactless chip 104 and a gesture control module 106. Both the contactless chip 104 and the gesture control module 106 are embedded on the payment instrument 102 and are coupled with each other. In an embodiment, the contactless chip 104 has an NFC (near-field communication) chip embedded on the payment instrument 102 which is configured to store and transmit user's payment credentials required in EMV (Europay, Mastercard and Visa) chip format for carrying out a transaction at an offline store. The contactless chip 104 makes contactless transactions using one or more near-field communication protocols. In an embodiment, the gesture control module 106 includes one or more electronic components or sensors such as an accelerometer, a gyroscope, a magnetometer, a pressure sensor, an altimeter, and the like which is configured to register, recognize and store the gestures detected when the user makes the gestures using the payment instrument 102. The one or more sensors are required for capturing the gestures made by the user for conducting the payment transaction.

Again, referencing to the definition of the access device in the above-sections, the access device 108 is an active electronic device capable of receiving signals from the payment instrument 102 and to process transactions. The access device 108 is configured to broadcast a unique identifier which enables the payment instrument 102 to detect the access device 108 and establish a secure communication through a contactless near-field communication protocol. The secure communication between the access device 108 and the contactless chip embedded on the payment instrument 102 is established through a secure communication link. In an embodiment, the access device 108 is an access device that is configured to receive payments from the payment instrument 102. The access device 108 is an active electronic device that generates electromagnetic fields when powered with electricity. This electromagnetic field is required for initiating contactless transactions from the contactless payment instrument 102. The range of the operating field generated by the access device 108 is governed by one or more contactless payment standards. Further, the access device 108 is also capable of accepting contact transactions by swiping or dipping the payment instrument 102 inside a dedicated slot of the access device 108. The access device 108, apart from communicating with contactless cards, performs various other functions such as displaying messages to the user, displaying messages to the merchant, accepting merchant data entry of the transaction amount, user (cardholder) verification, provision of online connections, provision of data capture for clearing and settlement.

In accordance with the various embodiments of the present disclosure, the access device 108 is operational by using an operating system. The access device 108 is also loaded with one or more access device reader applications configured for pre-processing, discovery and selection of the payment instrument 102. One such example of the access device reader application is an Entry Point Software which is configured for reading EMV chip data and is loaded on the access device 108. The access device reader application is further configured for activation of an appropriate kernel of the access device 108, handling outcomes returned to the kernel, including passing selected outcomes to be displayed on the access device 108 and the like. In accordance with the various embodiments of the present disclosure, the access device 108 also includes a kernel software configured for processing contactless transactions. The access device reader application is further configured/programmed to select the kernel based on the one or more predefined characteristics of the transaction.

In accordance with one or more embodiments of the present disclosure, the access device 108 is coupled with the merchant's computers (not shown in figure) for processing transactions. In an embodiment, the merchant's computer is configured to transmit authorization request message to the acquirer. The acquirer includes one or more computer systems to receive authorization request message from a plurality of merchant computers and transmit the same to the payment platform. The payment platform such as VisaNet™ is configured to receive the authorization request message and is further configured to route the transaction to issuer for debiting transaction amount from the user's payment instrument. The payment platform acts as a network that connects the merchant's account with the user's account. The authorizing entity such as an issuer, with the help of one or more systems, is configured to approve or reject the transaction carried out by the user's payment instrument based on one or more attributes of the transaction information. The approval or the rejection status is transmitted as the authorization response message. The authorization response message is transmitted to the payment platform and the payment platform is configured to pass on the authorization response message to the acquirer's systems. Further, the acquirer's systems are configured to update the authorization response message to the merchant, which is subsequently displayed on the access device 108. Once the payment status is displayed on the access device 108, the user can proceed for further steps such as picking up the goods, etc.

In accordance with the various embodiments of the present disclosure, when there is a transaction initiated by the payment instrument 102 which has the gesture control module, there may be a change in the process. Initially, when the payment instrument 102 is in the field of the access device 108, the access device 108 first transmits a transaction initiation signal and then receives the information from the payment instrument 102. The payment instrument 102 transmits the information to the access device 108 upon receiving a transaction initiation instruction encoded in the transaction initiation signal. The initial information provided by the payment instrument 102 includes a gesture enablement state. The gesture enablement state is interpreted by the access device 108 by decoding the information transmitted by the payment instrument 102. The information about the gesture enablement state is transmitted as a single bit data field decodable by the access device 108. The gesture enablement state can be one of "ACTIVE" state or "INACTIVE" state. The gesture enablement state intends to represent the gesture lock status of the payment instrument 102. When the gesture enablement state is "ACTIVE" state, the user is required to conduct a gesture-based authentication using the payment instrument and only after the authentication is successful, the payment instrument is configured to transmit the required payment information to the access device 108.

When the payment instrument 102 is enabled for gesture-controlled operation, as specified by the gesture enablement state, the access device 108 is programmed or configured to display a prompt to authenticate the transaction using gesture control on the access device 108. After this information is displayed on the access device 108, within a pre-configured time-frame, the user must perform one or more predefined gestures to authenticate the transaction. The gesture control module 106 on the payment instrument 102 detects the user's gesture using one or more sensors and decodes the gesture into machine-readable code. These machine-readable codes representing the detected gesture are compared with the previously stored gestures, again in the form of machine-readable code, and if these gestures match, the credentials are transmitted to the access device 108. When the gesture control module 106 fails to detect a gesture that matches the previously stored gestures, the payment instrument 102 is configured not to transmit any credentials to the access device 108. In another embodiment, when the gesture control module 106 fails to detect a gesture that matches the previously stored gestures, an error signal is transmitted to the access device 108, which is displayed on the display screen of the access device 108.

The gesture enablement state may be as set as a flag on the payment instrument 102 which is interpretable by the access device 108 through the reader application. The gesture enablement state is set using one of the available fields on the contactless chip 104 of the payment instrument 102. In accordance with the various embodiments of the present disclosure, the user may initially configure the gesture enablement state for the payment instrument 102. The user may configure the gesture enablement state for the payment instrument 102 by registering the payment instrument 102 on a third-party application such as a web application or a mobile application of the issuer or the payment platform or the merchant and enabling the payment instrument 102 for gesture-controlled authentication. Further, while enabling the gesture-controlled authentication on the payment instrument 102, the user has the option to configure the payment instrument 102 to authenticate the contactless transaction either by selecting one or more predefined gestures and/or creating a custom gesture.

For example, predefined gestures may include any known patterns for moving the payment instrument 102, such as moving the payment instrument 102 in a clockwise direction in the air, tapping the payment instrument 102 three times on the access device 108, or any other similar type of motion of the payment instrument 102 that may be detectable by the gesture control module 106. This predefined option can be selected by the user on the user interface of the third-party application such as the web application or the mobile application.

For the case of custom gesture control, the user may choose to define the gesture at any access device 108 for the first time. For example, the user may define the custom gesture for authenticating the transaction to be flipping the payment instrument 102 or rotating the payment instrument 102 in anti-clock wise direction, or any other similar type of motion of the payment instrument 102 that may be detectable by the gesture control module 106. The gestures selected or defined by the user must be recognized by the gesture control module 106 of the payment instrument 102 for enabling the transaction to take place at the access device 108. The same procedure for resetting or updating the gesture is followed where the user has to login to the web portal or mobile application and select appropriate options for updating or resetting the gestures. The user may have to authenticate himself before setting the custom gesture or while resetting the gesture of the payment instrument for avoiding fraud or misuse of the payment instrument. The authentication may be through a registered identity such as registered phone number, registered e-mail ID or through any other authentication means such as biometric authentication, PIN authentication and the like. Only after the user is authenticated, the user is allowed to activate, reset and inactivate the custom gesture setting.

In an embodiment, the one or more selected predefined gestures and/or one or more custom gestures are stored, in machine readable code, on the payment instrument 102 as a stored gesture. The stored gesture represents the gesture that the user may use to approve a transaction when the gesture enablement state flag is set to ACTIVE.

Figure 2:
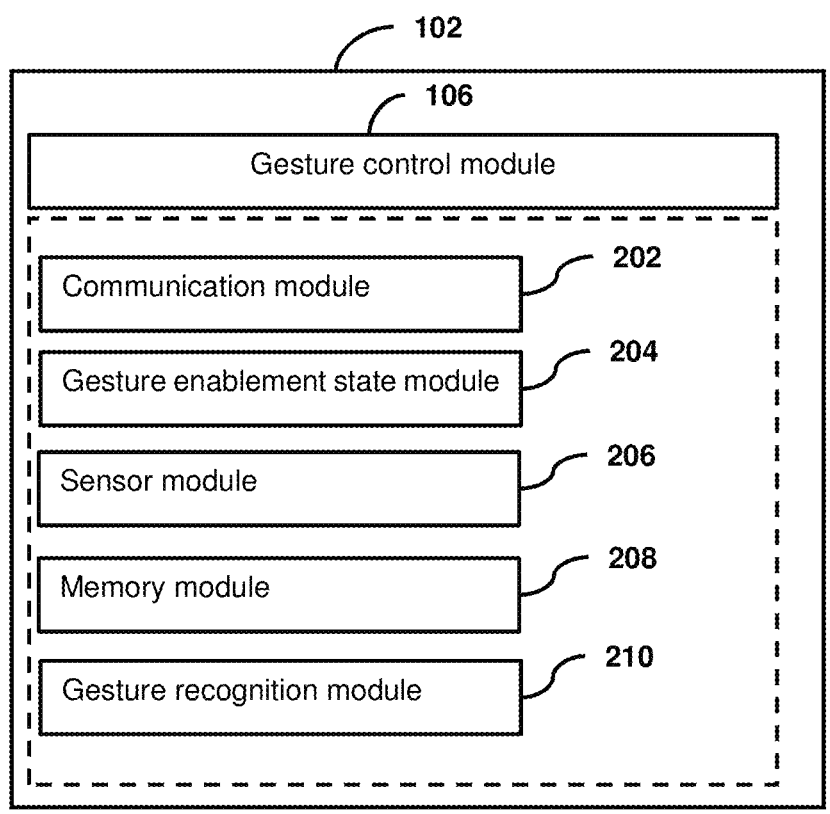
FIG. 2 is a block diagram illustrating the components of the gesture control module, in accordance with one or more embodiments.

FIG. 2 illustrates a block diagram 200 of the components of the gesture control module 106 in the payment instrument 102. The gesture control module 106 may include one or more submodules including, but not limited to a communication module 202, a gesture enablement state module 204, a sensor module 206, a memory module 208, and a gesture recognition module 210.

In accordance with the embodiments of the present disclosure, the communication module 202 is configured to communicate with the contactless chip in the payment instrument 102 and also with all the other submodules in the gesture control module 106. The communication module 202 communicates with the other modules and the chip using one or more communication protocols. The communication protocol used to communicate with the contactless chip and the other submodules include both wired and wireless communication protocols. The examples of the communication protocols include, but are not limited to Point-to-Point Protocol (PPP), Transmission Control Protocol (TCP), Internet Protocol (IP), File Transfer Protocol (FTP), Hyper Text Transfer Protocol (HTTP), Serial Line Internet Protocol (SLIP), and the like.

In accordance with the various embodiments of the present disclosure, the gesture control module 106 further includes the gesture enablement state module 204 which is configured to communicate with the contactless chip of the payment instrument 102 regarding the gesture enablement state of the payment instrument 102. The gesture control module 106 communicates with the contactless chip only when the payment instrument 102 is in the operating field of the access device 108. The communication from the gesture control module 106 is stored in one of the storage fields available on the chip of the payment instrument 102. The gesture enablement state module 204 is configured to provide the gesture enablement state of the payment instrument 102 to the access device. The gesture enablement state can be either one of "ACTIVE" state or "INACTIVE" state. The gesture enablement state transmitted from the payment instrument 102 to the access device allows the access device to determine if the payment instrument can make payment with or without gesture-based authentication. If the gesture enablement state is in "ACTIVE" state, then the user is required to make gesture based authentication whenever the payment instrument 102 is used for conducting the transaction in a card-present scenario. When the gesture enablement state is in "INACTIVE" state, the user of the payment instrument 102 is not required for authenticating the transaction using gesture based control.

In accordance with the various embodiments of the present disclosure, the gesture enablement state in the gesture enablement state module 204 is set by the user using a third-party application such a web application or a mobile application provided by the issuer, payment platform or the merchant itself. The user may select "ACTIVE" state or "INACTIVE" state using the user interface provided by the third-party application. The gesture enablement state is communicated to the payment instrument 102 the payment platform such as VisaNet™, whenever the payment instrument 102 is connected to the payment platform. The communication from the payment platform to the payment instrument 102 is by using one or more communication networks using one or more reliable and secure communication protocol.

The sensor module 206 is, in an embodiment, is a component of the gesture control module 106. The sensor module 206 comprises one or more electronic devices/components that aid the gesture control made by the user for authenticating the contactless transaction. The sensor module 206 includes one or more sensors such as accelerometer, a gyroscope, a magnetometer, altimeter, a pressure sensor and the like which registers, recognizes and stores the gesture enablement state of the payment instrument 102. The electronic components in the sensor module 206 may be hardware electronic devices that are passive in nature and work when they are in the operating field of the access device. The one or more sensors in the sensor module 206 may be used to detect the gestures made by the user while authenticating the payment transaction at the access device. In an embodiment, the accelerometer is used as one of the components of the sensor module 206 for capturing the tilting motion and orientation of the payment instrument 102.

The detected information is processed on the sensor module 206 itself or processed in an external component such as the gesture recognition module 210. The sensors or the electronic components in the sensor module 206 are embedded on the payment instrument 102. The gyroscope may also be present along with the accelerometer for tracking and capturing the rotation or the twist made by the user while authenticating the transaction using gesture control. Further, the sensor module 206 may comprise additional sensors optionally such as proximity sensors for determining the nearness of the objects (such as the proximity of the user or the proximity of the access device), a magnetometer for determining the simple orientation in relation to the Earth's magnetic field and the like. In an embodiment, the sensors in the sensor module 206 are integrated and embedded on the payment instrument 102.

The gesture control module 106 may include the gesture recognition module 210 that receives, detects, and processes the gestures made by the user on the payment instrument 102. The gesture recognition module 210 includes both hardware and software components that recognizes the gestures made by the user using one or more gesture recognition techniques known in the state of the art. The gesture recognition module 210 compares the stored predefined gesture with the gesture made by the user at the time of the transaction. The gesture recognition module 210 determines whether the detected gesture matches the stored gesture or not. In an embodiment, this determination is performed in real-time. The status determined by the gesture recognition module 210 constitutes the authentication status. The payment instrument 102 is configured to transmit the determined authentication status to the access device.

The gesture control module 106 further includes a memory module 208 configured for storing predefined gestures required for the gesture recognition module 210 to compare the gesture defined by the user previously to the gesture made by the user at the time of the transaction. Further, the memory module 208 may also comprise access memory modules (not shown in figure) required for functioning of the gesture control module 106. The examples of the access memory in the memory module 208 include but are not limited to random access memory (RAM), static random access memory (SRAM), and cache memory. The components of the gesture control module 106 may be integrated and embedded as a single module, or may be embedded as separate components and linked through appropriate communication protocols known in the state of the art. However, these components function as a single gesture control module 106 and communicates with the chip of the payment instrument in unison.

Now that the components are defined, the functionalities of the gesture control module 106 may be defined in an integrated manner. Initially, when the memory module 208 does not contain any predefined gestures, the memory required for storing the gesture is in null state. Now when the user wants to enable the gesture control to the payment instrument 102, the user will login to a web-portal or a mobile application and select appropriate option to enable the gesture control. This information through a communication network is updated to the payment platform, and the payment platform enables this option for the user when the payment instrument 102 is used next time. In an embodiment where the user selects one of the predefined options for authenticating the contactless transaction through gesture control, the option will be updated to the payment platform and the user can avail this option next time while paying for a transaction at the access device 108. When the user selects a predefined standard option provided on the web portal or the mobile application to authenticate the transaction by rotating the payment instrument 102 in a clockwise direction, the user can authenticate the next transaction by doing so in the next transaction. Each of the predefined gestures have a machine-readable code and the payment platform is configured to fetch this information and update it to the payment instrument 102 when the payment instrument 102 is the operating field of access device 108. This is enabled by configuring the access device 108 to communicate with the contactless chip 104 which in-turn communicates with the memory module 208 to update the memory for storing the selected predefined standard gesture. Therefore, whenever the user makes the selected predefined standard gesture, the gesture recognition module 210 is configured to recognize the gestures with the help of the electronic components/devices and compare it with the gesture stored in the memory module 208. Further, the gesture recognition module 210 is further configured to compute the authentication status and communicate the same to contactless chip of the payment instrument.

However, when the user chooses to define a custom gesture for authenticating the contactless transaction, the user must first register the gesture which has to be stored in the memory module 208 of the gesture control module 106. For this, the user has to first update in the third-party application that a custom gesture will be registered while making the next transaction. This information is updated to the payment platform, and the payment platform is configured to communicate this to the user through the display of the access device 108. When the user brings the payment instrument 102 in the operating field of the access device 108, a message may be prompted on the display to register the custom gesture. Now the user will register the custom gesture which is recorded by the sensor module 206. The sensor module 206 is configured to communicate with the gesture recognition module 210 and the memory module 208 for storing the gesture, and enabling the user to make gesture controlled authentication while making contactless transactions using the payment instrument 102. When the user intends to activate, reset or inactivate the gesture enablement state of the payment instrument 102, the user first needs to be authenticated. The user may be authenticated by identifying himself using a registered and trusted identity such as registered phone number, inputting a PIN, password, biometric authentication and the like. Only after the user is authenticated, the access device 108 allows the user to carry on further activities such as setting the gesture enablement state to "ACTIVE" state or setting the gesture enablement state to "INACTIVE" state or reset the custom gesture.

In accordance with the various embodiments of the present disclosure, the status determined by the gesture recognition module 210 also determines the authentication status of the user. The authentication status is computed in real-time by the gesture recognition module 210. The authentication status can be either "SUCCESS" state or "FAILURE" state. The authentication status is computed as "SUCCESS" state, if the gesture recognition module 210 computes a match between the gesture made by the user at the time of the transaction with the predefined gesture, and the "FAILURE" state when the gesture recognition module 210 computes a no-match between the gesture made by the user at the time of the transaction with the predefined gesture. In accordance with various embodiments of the present disclosure, the authentication status is provided as a confidence score. The confidence score is determined based on a match density of the captured gesture and the stored gesture. The match density for determining the confidence score is pre-configured at the time of registration. For example, when the captured gesture and the stored gesture has a match density of 60%, the confidence score may be computed as "6" and when the captured gesture and the stored gesture has a match density of 10%, the confidence score may be computed as "1". The computed confidence scores may be mapped with the authentication status. In accordance with the embodiments of the disclosure, the when the confidence score is in the range of 6-10; the authentication status may be provided as "SUCCESS" and when the confidence score below 5, then the authentication status may be provided as "FAILURE."

Once the authentication status is determined, the gesture recognition module 210 is configured to communicate the authentication status to the contactless chip 104 which in-turn communicates the authentication status to the access device 108.

As mentioned earlier, enabling gesture-controlled authentication while making contactless transaction requires modification and enhancement in the access device 108 too. In accordance with the various embodiments of the present disclosure, the access device 108 receives the authentication status, and based on the authentication status received, proceeds for further actions. The authentication status received by the access device 108 is processed by the reader application and is configured for processing further actions. In a scenario where the authentication status is received as "SUCCESS" state, the access device 108 is configured to receive credentials required for conducting the transaction. In a scenario where the authentication status is received as "FAILURE" state, the access device 108 is configured to display a message of the authentication failure on the display module of the access device 108. Further, the access device 108 may be further configured to display one or more options that a merchant or a user may take to complete the transaction. The one or more options may include, but are not limited to retying the gesture based authentication, conducting a contact authentication, accepting cash transaction, and the like. The one or more options are selected by the user or the merchant and the actions are processed further accordingly.

Figure 3:
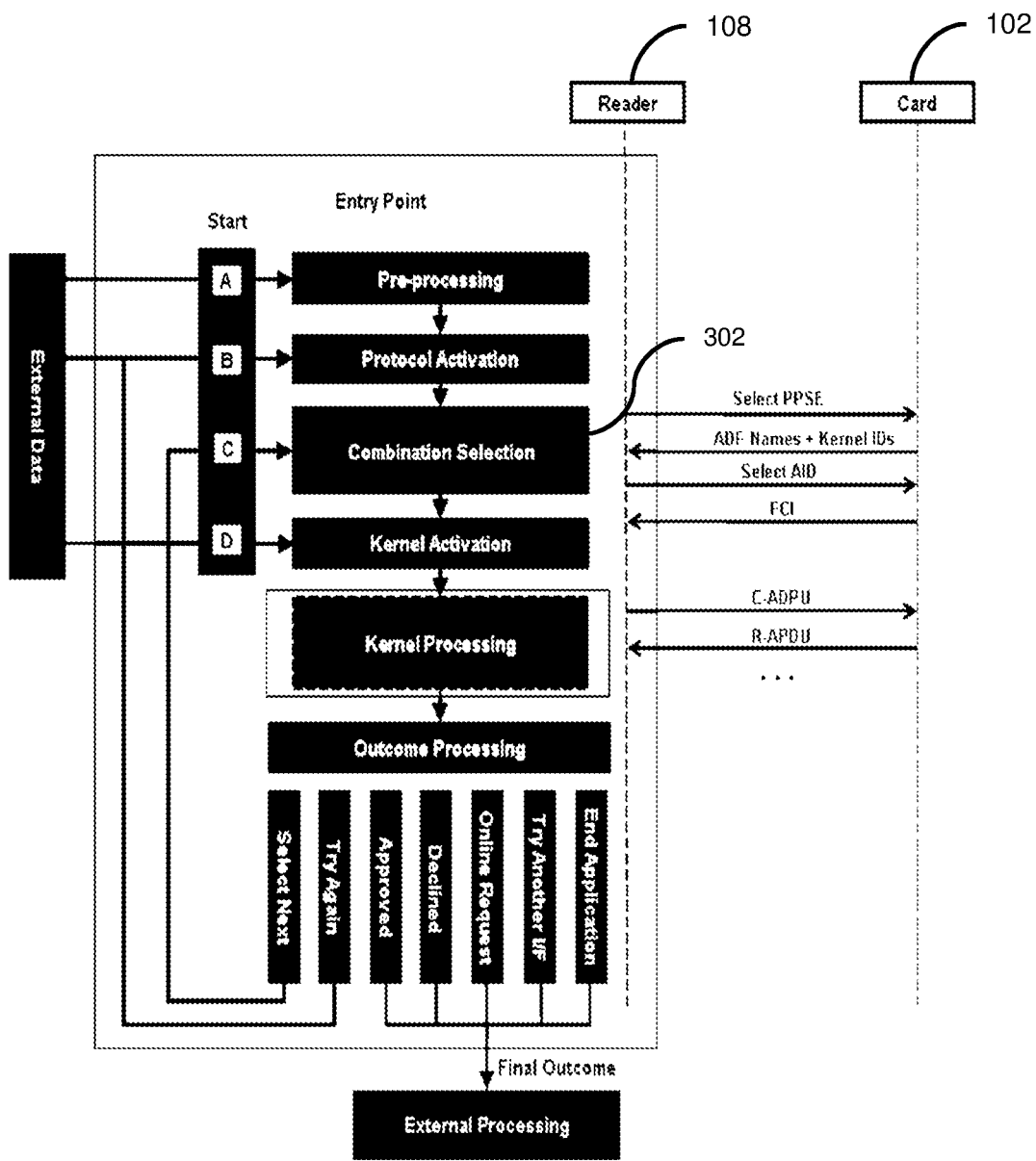
FIG. 3 is an architecture diagram of an access device reader application, in accordance with one or more embodiments.

FIG. 3 illustrates the block diagram 300 of the reader application of the access device 108 where the change or modification is required. The block diagram 300 is a specific example of the access device software for POS namely the Entry Point architecture provided by the EMVCo®. In the architecture, the enhancement is required in the "Combination Selection" module 302. As per the EMV® Specification (B_Entry_Point_Specification_v2_7_Final), the access device 108 is configured to send a SELECT command to the payment instrument 102. The payment instrument 102 is configured to check for the value of Gesture Enablement State data element and if it is:
  a. 0—the payment instrument 102 does not transmit any payment information required by the access device 108 in response to the SELECT command;
  b. 1—the payment instrument 102 responds to the SELECT in the usual manner as the specifications in EMV_v4.3_Bok_1_ICC_to_Terminal) Interface, 11.3.

Figure 4:
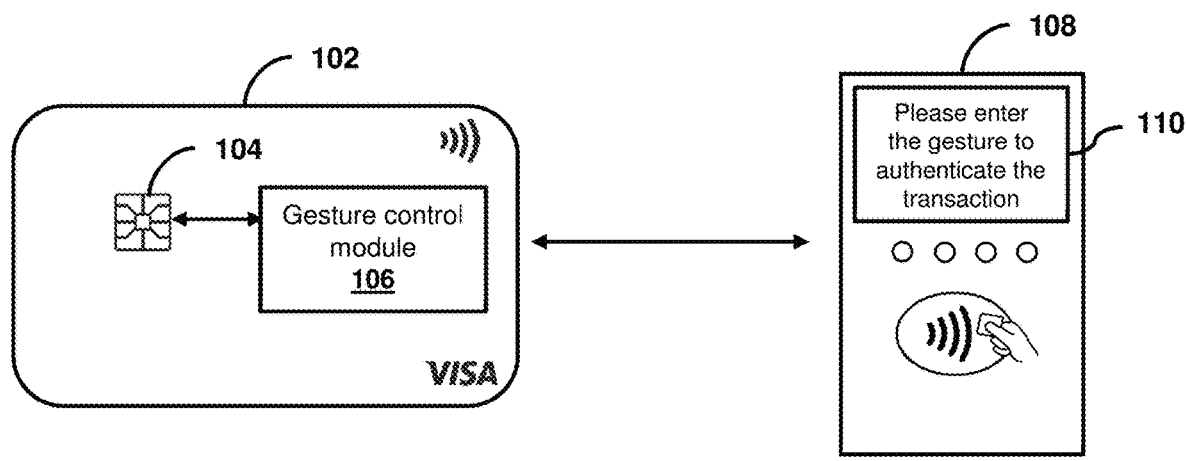
FIG. 4 is an illustration of gesture-controlled authentication on an access device, in accordance with one or more embodiments.

FIG. 4 is an illustration 400 of gesture-controlled authentication on the access device, in accordance with the various embodiments of the present disclosure. As shown the FIG. 400, the access device 108 includes a display module 110 which is configured to display the messages for the merchant or the user at the access device 108. In the example shown in FIG. 4, the display module 110 is displaying the message for the user of the payment instrument 102 to authenticate the transaction at the contactless access device 108 using one or more predefined gestures. The message is prompted on the display module 110 after the reader application detected through the SELECT flag data transmitted by the payment instrument 102 initially. After the display on the access device 108, the user must make the predefined gestures, which are recognized by the gesture control module 106, and the contactless chip 104 is configured to transmit the required payment information to the access device 108 for further processing of the transaction.

Figure 5:
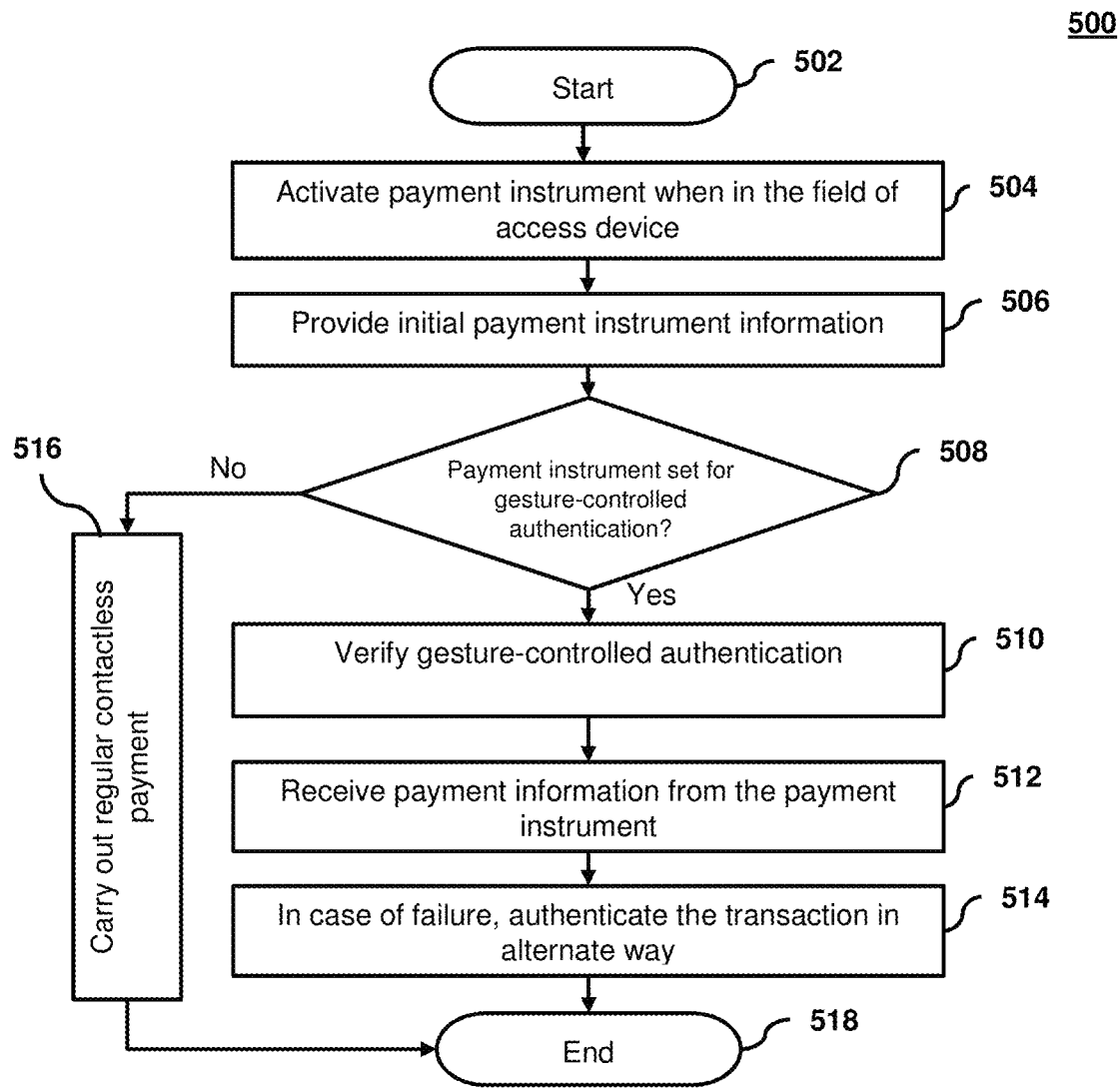
FIG. 5 is a flowchart explaining the steps for transacting using a gesture-controlled payment instrument, in accordance with one or more embodiments.

FIG. 5 is a flowchart 500 illustrating the process of carrying out the gesture based contactless transaction at the contactless access device. The process is initiated (Step 502). This can be initiated when the user begins an attempt to start a purchase at the access device. When the payment instrument is in the operating field of the access device, the payment instrument is powered up (Step 504). In an embodiment, when the payment instrument is powered up, the gesture control module and the components such as the sensor module and the gesture recognition module are also powered up and operational. Then the payment instrument is configured to transmit the initial payment information to the access device (Step 506). The initial payment information includes the gesture enablement state of the payment instrument. The initial information is processed by the reader application installed on the access device. Now, the reader application on the access device checks if the payment instrument is enabled for authentication (Step 508). If the payment instrument is not enabled for gesture-controlled authentication, the access device pulls the payment information from the payment instrument without any user intervention and works as a traditional contactless transaction (Step 516). Next, if the payment instrument is enabled for gesture-controlled authentication, a message is prompted on the display module of the access device to allow the user to make gesture. The gesture made by the user in the field of the access device is captured by the sensor module and is verified by the gesture recognition module embedded on the payment instrument. The verification status is transmitted to the access device through the chip on the payment instrument (Step 510). The verification status transmitted to the access device and the Entry Point software processes this data and enables the access device to pull the payment information required for the transaction from the payment instrument (Step 512). If the access device in conjunction with the payment instrument can complete all the above-mentioned step in a predefined timeframe, the contactless transaction is successful and the procedure for authenticating the transaction using gesture-controlled payment instrument is completed. However, due to one or more reasons the contactless transaction using gesture-controlled authentication fails, the access device is configured to authenticate the transaction in alternate way (Step 514). The alternate ways of authentication include but are not limited to dipping the payment instrument in the access device, swiping the payment instrument in the access device, PIN based authentication, biometric authentication and the like. Once the access device receives the payment information from the access device and further proceeds to process the transaction, the process for contactless transaction at the merchant location ends (Step 518).

In accordance with the various embodiments of the present disclosure, the computers configured by the merchant payment, platform, issuer systems may include a bus or other communication mechanism for addressing main memory and for transferring data between and among the various components of device. The computers may also include one or more hardware processors coupled with bus for processing information. A hardware processor may be a general purpose microprocessor, a system on a chip (SoC), or other processor.

Main memory, such as a random access memory (RAM) or other dynamic storage device, also may be coupled to bus for storing information and software instructions to be executed by processor(s). Main memory also may be used for storing temporary variables or other intermediate information during execution of software instructions to be executed by processor(s).

Software instructions, when stored in storage media accessible to processor(s), render computers into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

The computers in the merchant systems, portable consumer device, issuer systems also may include read only memory (ROM) or other static storage device coupled to bus for storing static information and software instructions for processor(s).

One or more mass storage devices may be coupled to bus for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices (e.g., the main hard disk for the device) stores a body of program and data for directing operation of the computing device, including an operating system, user application programs, driver and other support files, as well as other data files of all sorts.

The computers may be coupled via bus to display, such as a liquid crystal display (LCD) or other electronic visual display, for displaying information to a computer user. In some configurations, a touch sensitive surface incorporating touch detection technology (e.g., resistive, capacitive, etc.) may be overlaid on display to form a touch sensitive display for communicating touch gesture (e.g., finger or stylus) input to processor(s).

An input device, including alphanumeric and other keys, may be coupled to bus for communicating information and command selections to processor. In addition to or instead of alphanumeric and other keys, input device may include one or more physical buttons or switches such as, for example, a power (on/off) button, a "home" button, volume control buttons, or the like.

Another type of user input device may be a cursor control, such as a mouse, a trackball, or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

Functions of the disclosed systems, methods, and modules may be performed by computing device in response to processor(s) executing one or more programs of software instructions contained in main memory. Such software instructions may be read into main memory from another storage medium, such as storage device(s). Execution of the software instructions contained in main memory cause processor(s) to perform the functions of the example embodiment(s).

While functions and operations of the example embodiment(s) may be implemented entirely with software instructions, hard-wired or programmable circuitry of computing device (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device. Volatile media includes dynamic memory, such as main memory. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus. Transmission media can also take the form of acoustic or light waves, such as those generated during radio-wave and infra-red data communications.

Various forms of media may be involved in carrying one or more sequences of one or more software instructions to processor(s) for execution. For example, the software instructions may initially be carried on a magnetic disk or solid-state drive of a remote computer. The remote computer can load the software instructions into its dynamic memory and send the software instructions over a telephone line using a modem. A modem local to computing device can receive the data on the telephone line and use an infra-red transmitter to convert the data to an infra-red signal. An infra-red detector can receive the data carried in the infra-red signal and appropriate circuitry can place the data on bus. Bus carries the data to main memory, from which processor(s) retrieves and executes the software instructions. The software instructions received by main memory may optionally be stored on storage device(s) either before or after execution by processor(s).

The computers also may include one or more communication interface(s) coupled to bus. A communication interface provides a two-way data communication coupling to a wired or wireless network link that is connected to a local network (e.g., Ethernet network, Wireless Local Area Network, cellular phone network, Bluetooth wireless network, or the like). Communication interface sends and receives electrical, electromagnetic, or optical signals that carry digital data streams representing various types of information. For example, communication interface may be a wired network interface card, a wireless network interface card with an integrated radio antenna, or a modem (e.g., ISDN, DSL, or cable modem).

Network link(s) typically provide data communication through one or more networks to other data devices. For example, a network link may provide a connection through a local network to a host computer or to data equipment operated by an Internet Service Provider (ISP). ISP in turn provides data communication services through the world wide packet data communication network now commonly referred to as the "Internet". Local network(s) and Internet use electrical, electromagnetic or optical signals that carry digital data streams. The signals through the various networks and the signals on network link(s) and through communication interface(s), which carry the digital data to and from computing device, are example forms of transmission media.

The computers can send messages and receive data, including program code, through the network(s), network link(s) and communication interface(s). In the Internet example, a server might transmit a requested code for an application program through Internet, ISP, local network(s) and communication interface(s). The received code may be executed by processor as it is received, and/or stored in storage device, or other non-volatile storage for later execution.

The software systems may be employed for controlling the operation of computing device. Software system and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system is provided for directing the operation of computing device. Software system, which may be stored in system memory (RAM) and on fixed storage (e.g., hard disk or flash memory), includes a kernel or operating system (OS).

The OS manages low-level aspects of computer operation, including managing execution of processes, memory allocation, file input and output (I/O), and device I/O. One or more application programs, may be "loaded" (e.g., transferred from fixed storage into memory) for execution by the system. The applications or other software intended for use on device may also be stored as a set of downloadable computer-executable instructions, for example, for downloading and installation from an Internet location (e.g., a Web server, an app store, or other online service).

Software systems include a graphical user interface (GUI) for receiving user commands and data in a graphical (e.g., "point-and-click" or "touch gesture") fashion. These inputs, in turn, may be acted upon by the system in accordance with instructions from operating system and/or application(s). The GUI also serves to display the results of operation from the OS and application(s), whereupon the user may supply additional inputs or terminate the session (e.g., log off).

In accordance with the embodiments of the present disclosure, the authentication module can execute programs directly on the bare hardware. Alternatively, a hypervisor or virtual machine monitor (VMM) may be interposed between the bare hardware and the operating system of the authentication module. In this configuration, VMM acts as a software "cushion" or virtualization layer between the OS and the bare hardware of the authentication module.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present disclosure have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
storing, with a memory of a payment instrument, one or more predefined gestures in a form of machine-readable code;
detecting, with a contactless chip of the payment instrument, an operating field of an access device;
receiving, with the contactless chip of the payment instrument, a transaction initiation instruction from the access device;
in response to receiving the transaction initiation instruction, establishing, with the contactless chip of the payment instrument, a communication with the access device through a near-field communication protocol;
transmitting, with the contactless chip of the payment instrument, a gesture enablement state to the access device through the established near-field communication protocol, wherein the gesture enablement state is either of "ACTIVE" state or "INACTIVE" state;
capturing, with a gesture control module of the payment instrument, one or more gestures made by a user with the payment instrument in the operating field of the access device including capturing, with an accelerometer of the gesture control module, a tilting motion and an orientation of the payment instrument in the operating field of the access device and capturing, with a gyroscope of the gesture control module, a rotation of the payment instrument made by the user with the payment instrument in the operating field of the access device, wherein the one or more gestures are captured when the gesture enablement state is in "ACTIVE" state, and wherein the payment instrument including the gesture control module including the accelerometer and the gyroscope are powered up and operational only with the payment instrument in the operating field of the access device;
validating, with the gesture control module of the payment instrument, the captured gestures made by the user using the payment instrument by converting the captured gestures to the form of the machine-readable code and comparing the one or more captured gestures made at the time of the transaction with the one or more predefined gestures stored in the memory of the payment instrument, wherein validating the gestures determines an authentication status of the user, and wherein the authentication status is either of "SUCCESS" state or "FAILURE" state; and
transmitting, with the contactless chip of the payment instrument, credentials and the authentication status to the access device in a predefined timeframe.

2. The method of claim 1, wherein the gesture enablement state is stored as a flag variable in the contactless chip of the payment instrument.

3. The method of claim 1, wherein the authentication status is stored as a flag variable in the contactless chip of the payment instrument.

4. The method of claim 1, wherein the gesture enablement state is specified by the user of the payment instrument, wherein the gesture enablement state is specified through a third-party application, and wherein the third-party application is provided by an issuer of the payment instrument.

5. The method of claim 1, wherein the payment instrument transmits the credentials of the user for processing the transaction only when the authentication status is determined as SUCCESS.

6. The method of claim 1, wherein the payment instrument is configured to validate the gesture made by the user of the payment instrument, when the captured gesture is made in a predefined timeframe.

7. The method of claim 1, wherein capturing, with the gesture control module of the payment instrument, the one or more gestures made by the user with the payment instrument in the operating field of the access device further includes capturing, with a magnetometer of the gesture control module, a simple orientation of the payment instrument in relation to a magnetic field of the Earth in the operating field of the access device.

* * * * *